Patented June 15, 1954

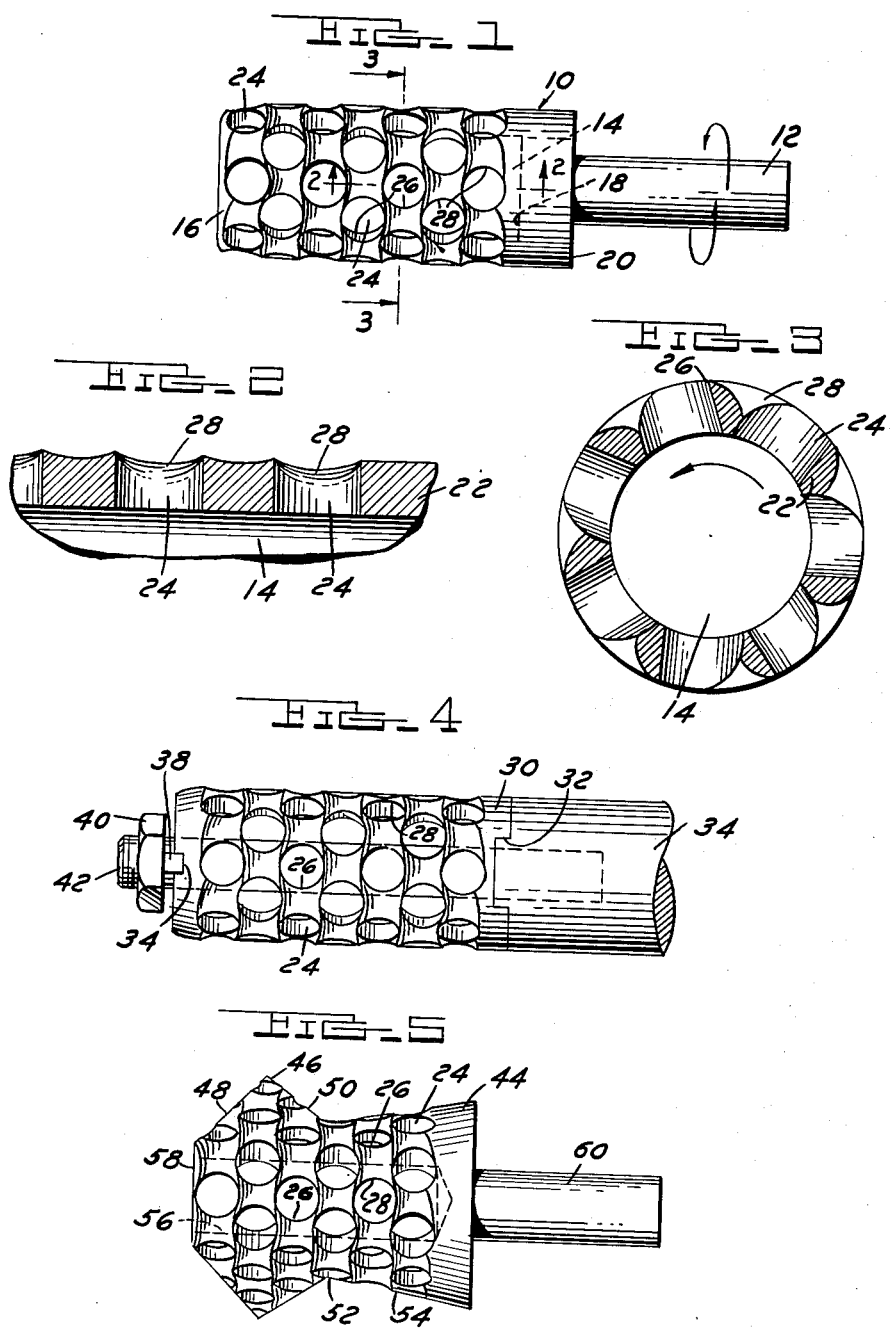

2,680,898

UNITED STATES PATENT OFFICE 2,680,898

CUTTING TOOL

Michael Diosi, Sr., Romulus, Mich., assignor to Frank Diosi, Detroit, Mich.

Application November 27, 1950, Serial No. 197,789

2 Claims. (Cl. 29—103)

This invention relates to a cutting tool and particularly to a tool for cutting soft metals.

In the machining of soft materials, such as aluminum, lead, brass, etc., considerable difficulty has been encountered in the past because of the tendency of the chips formed to cling to the tool and clog the spaces between the cutting edges of the tool. This is especially true where such soft metals are worked upon with rotary cutting tools, such as rotary files. When rotary files are used on such soft metals, the operator finds it necessary to frequently stop the cutting operation and remove the chips adhering to the file between the teeth thereof.

It is an object of this invention to provide a rotary cutting tool which is admirably suited for cutting soft metals.

More specifically, the invention contemplates a cutting tool in the form of a tubular body having an axial bore therein open at one end of the body and a plurality of openings extending through the tubular wall of the tool, the openings being formed with cutting edges such that the chips removed from the material being cut pass through the openings into the bore of the tool and are automatically discharged through the open end of the tool by reason of the rotary movement of the tool.

In the drawings:

Fig. 1 is a side elevation of a tool formed in accordance with the present invention.

Fig. 2 is a sectional view taken along the lines 2—2 in Fig. 1.

Fig. 3 is a sectional view taken along the lines 3—3 in Fig. 1.

Figs. 4 and 5 show modified forms of the tool of this invention.

Referring to the drawings and particularly to Fig. 1 there is illustrated a rotary cutting tool having a generally cylindrical body 10 and a shank 12 extending axially from one end of the tool. The body 10 is bored axially, as at 14. The bore 14 extends from the end 16 of the tool inwardly towards the other end of the tool and terminates, as at 18, in a plane spaced inwardly of the end face 20 of the tool from which the shank 12 projects. It will be observed that the bore 14 defines an annular wall 22 on the body 10 of the tool. A plurality of holes 24 are drilled radially in wall 22. These holes are spaced closely together and are arranged in rows extending both circumferentially and axially of the tool, the rows being staggered both axially and circumferentially about body 10.

As is illustrated more clearly in Fig. 3, the holes 22 are fashioned with cutting edges 26 at one side thereof and are backed off on the opposite side thereof, as at 28. The cutting edges 26 and the backed off portions 28 are formed by removing metal, as by grinding, from the outer surface of wall 22. Between successive holes 24 in each circumferential row the metal is removed from the side wall 22 such that, when the tool is rotated, the leading edge of each hole is relieved and the trailing edge of each hole provides a cutting edge.

It will be noted that, although the body of the tool is hollow and the side wall 22 extensively perforated, the tool itself, because of the staggered arrangement of the holes, is quite rigid. Furthermore, the staggered arrangement of the holes provides cutting edges which are relatively closely spaced both circumferentially and axially of the tool.

The shank 12 is adapted to be gripped within a rotating support, such as the chuck or spindle of an electrically driven hand grinder. When the tool is rotated in the direction indicated by the arrow in Fig. 3 and manipulated such that the side wall 22 bears against the material to be cut, it will be observed that a plurality of rotating cutting edges 26 are engaged with the material worked upon. These edges 26 cut small chips from the material, and these chips pass through the openings 24 to the center bore 14. The rotary movement of the tool causes the chips to be discharged through the opened end 16 of the tool.

It will be appreciated that the tool may be formed with various external shapes, the primary feature of the invention being the central, axially extending bore within the tool in combination with the numerous closely spaced radial holes in the side wall of the tool which are shaped with cutting edges at one side and which are relieved along the opposite side to provide clearance for these cutting edges. The tool may be formed from a length of cylindrical tubing 30, such as illustrated in Fig. 4. In this instance the radial holes 24 will be arranged in the manner described with reference to Figs. 1 through 3 and will likewise be fashioned with cutting edges, as at 26, and relieved along the opposite side, as at 28. The tool itself will be open at both ends, one end being diametrically slotted, as at 32, to interfit with a spindle 34 and the other end being slotted, as at 36, for the reception of a key 38. Key 38 is arranged to be clamped in slot 32 by a nut 40 threadedly arranged at the outer end of a stud 42. Stud 42 extends axially through the bore of the tool and is secured or formed integrally with spindle 34.

In Fig. 5 there is shown another shape into which the tool of the invention may be fashioned. In this embodiment the body 44 of the tool is of round cross section, as in the other forms described; but the external contour of the tool is irregular in a direction axially of the tool so as to accommodate the tool to work pieces of special shapes or to enable the tool to have access into sharp corners and the like which might not be accessible with the forms of tools previously described. In this instance the tool is shaped on its outer surface with a shoulder 46 which is defined by the intersection of two oppositely disposed conical surfaces 48 and 50. The tool is also provided on its outer face with a groove 52 which is defined by the conical surface 50 and an oppositely arranged conical surface 54. As in the previous embodiment described, the body of the tool is provided with a plurality of radially disposed holes 24 arranged in staggered rows, the holes being fashioned with cutting edges 26 at one side thereof and being relieved, as at 28, along the opposite side thereof to provide clearance for the cutting edges 26. Also, as in the previous forms of tool described, the body 44 is bored axially, as at 56, from the end 58 of body 44. The opposite end of the body is fashioned with an axially projecting shank 60.

It will thus be seen that I have provided a tool which is admirably suited for cutting soft metals. The cutting tooth edges are closely spaced such that the cutting action is continuous around the circumference of the tool and at the same time ample clearance in the form of radial holes opening into an axial bore is provided for chip removal.

I claim:

1. A rotary cutting tool comprising a body having an annular wall defining an axial bore open at one end of said body, means on said body for mounting the tool on a support which rotates in one direction, said annular wall having a plurality of openings therein which are staggered radially and circumferentially of said annular wall, said openings being fashioned with cutting edges adjacent the outer surface of said annular wall, said cutting edges extending around the trailing side of each opening, said cutting edges lying in the plane of the outer surface of said annular wall, the portion of said wall extending circumferentially between the cutting edge of one opening and the forward edge of the next adjacent opening in the direction of rotation sloping inwardly so that the leading edge of each opening is spaced below the plane of the outer surface of said annular wall.

2. A rotary cutting tool comprising a body having an annular wall defining an axial bore opening at one end of said body, means on said body for mounting the tool on a support which rotates in one direction, said annular wall having a plurality of openings therein which are staggered radially and circumferentially of said annular wall, said openings being fashioned with cutting edges adjacent the outer surface of said annular wall, said cutting edges extending around approximately half of the edge of each opening on the trailing side thereof, said cutting edges lying in the plane of the outer surface of said annular wall, the portion of said wall extending circumferentially between the cutting edge of one opening and the forward edge of the next adjacent opening in the direction of rotation sloping inwardly so that approximately half of the edge of each opening on the leading side thereof is disposed below the plane of the outer surface of said annular wall.

References Cited in the file of this patent

UNITED STATES PATENTS

| Number | Name | Date |
|---|---|---|
| 345,312 | Mason | July 13, 1886 |
| 388,797 | Todd | Aug. 28, 1888 |
| 423,540 | Todd | Mar. 18, 1890 |
| 1,163,867 | Shaffer | Dec. 14, 1915 |
| 1,488,766 | Quist | Apr. 1, 1924 |
| 2,312,176 | Kotowski | Feb. 23, 1943 |
| 2,418,767 | Hall | Apr. 8, 1947 |

FOREIGN PATENTS

| Number | Country | Date |
|---|---|---|
| 11,806 | Great Britain | May 5, 1904 |
| 54,536 | Germany | Nov. 28, 1890 |